United States Patent
Kanno

(10) Patent No.: US 7,027,030 B2
(45) Date of Patent: Apr. 11, 2006

(54) MAGNETIC DISPLAY

(75) Inventor: Yasuyuki Kanno, Tokyo (JP)

(73) Assignee: Japan Capsular Products, Inc., Tokyo (JP)

( * ) Notice: Subject to any disclaimer, the term of this patent is extended or adjusted under 35 U.S.C. 154(b) by 466 days.

(21) Appl. No.: 10/298,675

(22) Filed: Nov. 19, 2002

(65) Prior Publication Data

US 2003/0098830 A1 May 29, 2003

(30) Foreign Application Priority Data

Nov. 27, 2001 (JP) .................................. 2001-360814

(51) Int. Cl.
*G09G 3/34* (2006.01)

(52) U.S. Cl. ........................... 345/108; 345/48; 345/84; 345/86; 345/107

(58) Field of Classification Search ................ 345/108, 345/48, 84, 86, 107–109, 85, 105, 111, 206, 345/214; 349/23, 62
See application file for complete search history.

(56) References Cited

U.S. PATENT DOCUMENTS 4,394,287 A * 7/1983 Scarpelli .................... 264/4.32
5,972,493 A * 10/1999 Iwasaki et al. ............. 428/323
2002/0018044 A1 * 2/2002 Yasuda ....................... 345/111

* cited by examiner

*Primary Examiner*—Vijay Shankar
*Assistant Examiner*—Leonid Shapiro
(74) *Attorney, Agent, or Firm*—Wenderoth, Lind & Ponack. L. L. P.

(57) ABSTRACT

A magnetic display has two non-magnetic substrates, at least one of which is transparent; and a microcapsule coating layer is applied between the non-magnetic substrates. The microcapsules contain and seal light-absorptive black magnetic fine particles and light-reflective non-magnetic fine particles dispersed in an oily dispersion liquid. An array layer is buried in a capsule wall of each of the microcapsules for enclosing the oily dispersion liquid that contains the light-absorptive black magnetic fine particles and light-reflective non-magnetic fine particles. The array layer includes flake-shaped particles with a multi-layered structure for converting the black color of a character or image formed on a display surface, which is a color inherently exhibited by the light-absorptive black magnetic fine particles, into a variety of interference colors. The flake-shaped particles are arranged so as to be oriented parallel to the surface of the capsule wall along the entire spherical surface of the microcapsule.

5 Claims, 6 Drawing Sheets

A, C: IMAGE BACKGROUND PORTION WITH INTERFERENCE COLOR A

B: IMAGE-FORMING PORTION WITH INTERFERENCE COLOR B

A: IMAGE BACKGROUND PORTION WITH NO INTERFERENCE COLOR.
   (MAGNETIC PARTICLES ARE ATTRACTED TO REVERSE SIDE)

B: IMAGE-FORMING PORTION WITH INTERFERENCE COLOR.
   (MAGNETIC PARTICLES ARE ATTRACTED TO FRONT SIDE)

C: IMAGE BACKGROUND PORTION WITH NO INTERFERENCE COLOR.
   (BOTH MAGNETIC AND NON-MAGNETIC PARTICLES ARE SETTLED DOWN AT BOTTOM)

A, C: IMAGE BACKGROUND PORTION WITH INTERFERENCE COLOR A

B: IMAGE-FORMING PORTION WITH INTERFERENCE COLOR B

Fig. 7    PRIOR ART
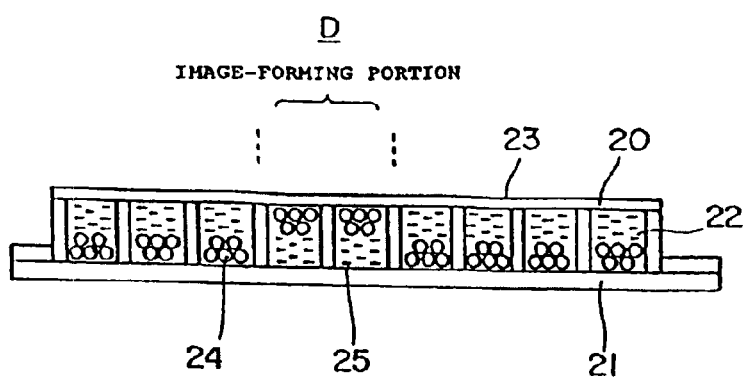
Fig. 8    PRIOR ART
A: WHITE BACKGROUND PORTION.
   (MAGNETIC PARTICLES ARE ATTRACTED TO REVERSE SIDE)
B: IMAGE-FORMING PORTION IN BLACK COLOR.
   (MAGNETIC PARTICLES ARE ATTRACTED TO FRONT SIDE)
C: WHITE BACKGROUND PORTION.
   (BOTH MAGNETIC AND NON-MAGNETIC PARTICLES ARE SETTLED DOWN AT BOTTOM)
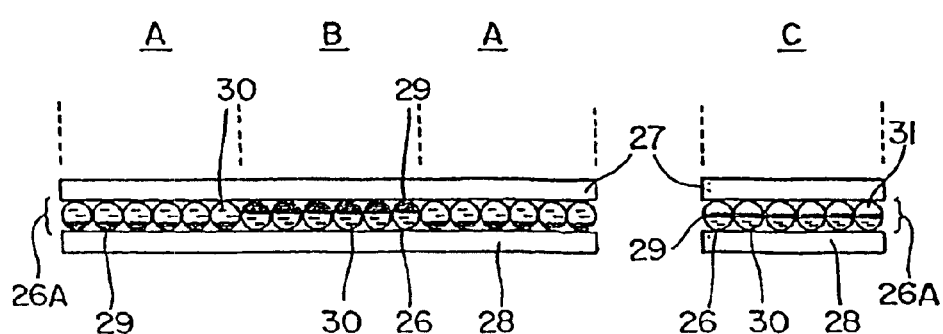

Fig. 9     PRIOR ART
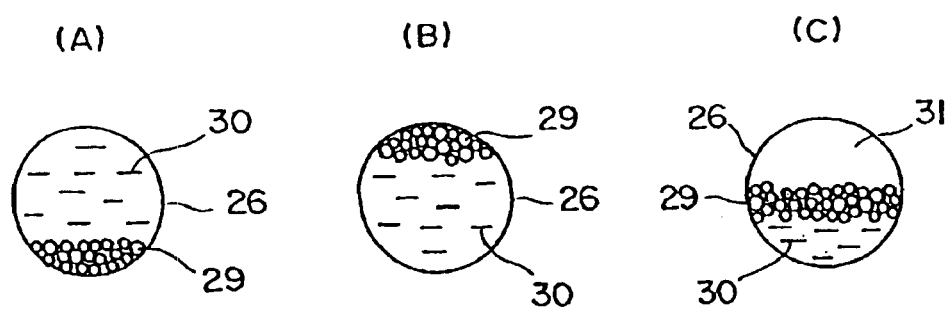
Fig. 10     PRIOR ART
A: OTHER THAN IMAGE-FORMING PORTION REFLECTED
B: IMAGE-FORMING PORTION TRANSMITTED
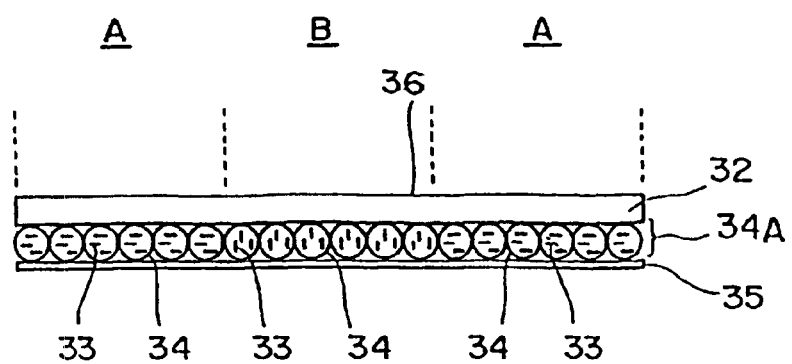

Fig. 11    PRIOR ART
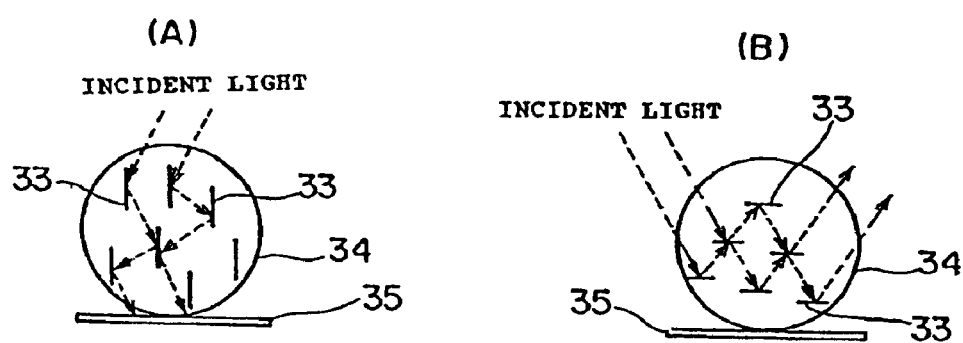
Fig. 12    PRIOR ART
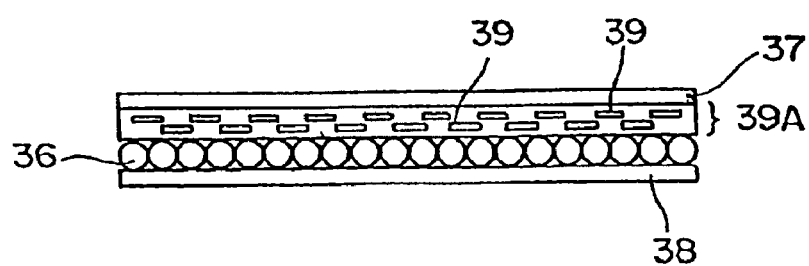

MAGNETIC DISPLAY

BACKGROUND OF THE INVENTION

1. Field of the Invention

This invention relates to a magnetic display wherein an image formation is performed by migrating two components of magnetic particles and non-magnetic particles in a dispersion liquid or by changing the orientation of a single component of magnetic flakes, allowing colorization of an image to be formed on a display surface.

2. Description of the Related Art

Magnetic displays currently on the market can be classified into two groups with respect to their image formation methods.

(1) One group is of the so-called "magnetic migration" type magnetic display. Two components of magnetic particles and non-magnetic particles are dispersed in a liquid and then an external magnetic field is applied thereon to shift the positions of both components to the front surface or back surface of the display, thereby forming characters or images thereof. In this case, black iron oxide fine particles or their granulated particles or the like having excellent light-absorption properties (i.e., absorbing the whole range of visible light wavelengths) are used as the magnetic particles, while the magnetic display also includes white pigments such as titanium oxide having excellent light-reflection properties (i.e., having high reflectivity to allow scatter reflections of an incident light). Therefore, a color contrast is provided using black color and white color inherent in the respective components.

(2) The other group is of the so-called "magnetic orientation" type magnetic display. Only magnetic flakes having anisotropy of shape are dispersed and suspended in a liquid, followed by the application of a magnetic field from the outside in the horizontal or vertical direction to change the orientation of magnetic flakes from horizontal to vertical or from vertical to horizontal. Therefore, a color contrast is provided using the reflection of an incident light on the surfaces of the magnetic particles at the time of a horizontal orientation and the transmission of an incident light at the time of a vertical orientation.

These magnetic displays each requires sealed containers, for enabling magnetic migration of magnetic particles or the change in polarity orientation of magnetic flakes in a dispersion liquid obtained by dispersing image-forming elements in a liquid and for keeping the display surface in a state in which the dispersion liquid is uniformly distributed on the display surface without the uneven distribution thereof. In addition, there are also several different kinds of magnetic displays according to the difference in the method for developing and maintaining the image-forming elements on the display surface. Heretofore, images formed by these magnetic displays are restricted to those of black color without exceptions as black iron oxide are used as the magnetic particles of the image-forming elements. Recently, however, there has been a demand for colorization of an image to be formed, so that several patent applications have been already filed. This invention is also provided for serving such a need. As such, the comparison between the present invention and the prior art should be only made with respect to a colorization mechanism of the magnetic display. For the accurate comparison between the colorization methods and the accurate evaluation thereof, however, the understanding of the characteristic features of the image formation method, image-formation elements, and the dispersion liquid to be used for the above magnetic display, and also of the characteristic features of the micro container to hold such dispersion liquid is essential. In the following description, therefore, the characteristics of each display will be explained prior to making a comparison between the colorization mechanisms.

<Distinct features of the conventional magnetic display>

A sealed container, as shown in FIG. 7, to be used in a conventional magnetic display uses a plurality of honeycomb cells 22 which are divided by partitions thereof and sandwiched between two non-magnetic substrates 20, 21 in which at least one thereof is transparent. In addition, a dispersion liquid is filled in each of the honeycomb cells 22. In this case, the honeycomb cell 22 as a container of the dispersion liquid aims at sealing the dispersion liquid and has a function of uniformly distributing two components of black magnetic particles 24 and light-reflective non-magnetic fine particles 25 for forming an image on each part of the display face 23 without uneven distribution. Further, the dimensions of black magnetic particles 24 are selected so as to be adequate for the dimensions of the honeycomb cells 22, while the viscosity and thixotropic property of a dispersant are designed so as to be adequate for the dimensions and specific gravity of the black magnetic particles 24. That is, the black magnetic particles 24 used are those being granulated to the dimensions thereof to have appropriate liquid viscosity and thixotropic property which prevent a rapid precipitation of black magnetic particles 24 (part "D" in FIG. 7) after the image formation, where the particles 24 form an image by shifting to the front surface of the display under the application of an external magnetic field, and to allow the movements at a sufficient speed even though they are in the liquid having the above viscosity when the external magnetic field is applied to the image formation or deletion.

<Distinct features of the improved magnetic display>

In contrast to the conventional display characterized as described above, as shown in FIG. 8, the improved magnetic display includes microcapsules 26 as containers for holding a substantially small amount of dispersion liquid, hardly compared with that of the above honeycomb cells 22. A microcapsule layer 26A is applied between two non-magnetic substrates 27, 28 in which at least one thereof is transparent. Here, the dimensions of both the honeycomb cell 22 and the microcapsule 26 are simply compared in terms of their volumes. As the volume of the honeycomb cell 22 is 6.99 mm$^3$ and the volume of the microcapsule 26 is 0.014 mm$^3$, the volume of the latter is about 1/499 of the volume of the former and thus the microcapsule 26 can be a minute container. Therefore, the magnetic particles to be used have sufficient functions even though they are minute particles (fine powders) having the particle size of about 1/170, allowing a stable image formation in the dispersant having a comparatively low viscosity appropriate to such a particle size.

In the improved magnetic display, the usage of the microcapsule 26 as a sealed container for holding dispersion liquid in which display elements (black magnetic fine particles 29 and light-reflective non-magnetic fine particles 30) are dispersed has a remarkable effect in resource savings as the size reduction of the sealed container is attained as described above, in addition to an excellent advantage in the liquid sealing performance, as compared with a system in which the dispersion liquid is stored in honeycomb cells 22 formed by mechanically providing partitions between two conventional hard substrates 20, 21 as containers for holding the dispersion liquid. For example, the conventional magnetic display has a hard panel structure in which partitions in the shape of honeycombs are adhered between two hard plastic substrates, so that there is a possibility that any adhered portion of the partitions may be peeled off by the application of a force that is enough to cause a slight warp in the panel. In this case, the dispersion liquid may spill or move into the adjacent honeycomb cell 22. On the other hand, such disadvantages will not occur in the improved magnetic display.

Further, another advantage of the improved magnetic display is its availability as a message display of a personal computer or a facsimile machine. By excellent functions (microminiaturization and high sealing effect) for holding the dispersion liquid, it is provided as a structure by forming it into a soft endless roll with a good flexibility to be attached between two rotational shafts so that it performs an electrically-powered rotational movement between a magnetic head for character or image formation and an erasing magnetic head.

As the sealed containers for holding the dispersion liquid are remarkably microminiaturized by the microcapsules 26, the following functional advantage can occur. That is, for responding to an application of a magnetic field by a write operation using a magnetic pen or the like, black magnetic fine particles 29 that form characters and images written on the front surface of the display by moving to the front surface of the display in the microcapsules 26 (Part "B" in FIG. 8) can be settled to the bottoms of the respective microcapsules 26 to keep their stable states (Part "C" in FIG. 8), while maintaining relative positions between the black magnetic fine particles 29 and light-reflective non-magnetic fine particles 30 after image formation, i.e., maintaining their positions such that the black magnetic fine particles 29 locate on the top side while the light-reflective non-magnetic fine particles 30 locate on the bottom side. Any character or image formed by black magnetic fine particles 29 in such a stably settled state can be displayed on the front surface of the display through a transparent substrate 27, a transparent microcapsule capsule wall, and a transparent dispersant (supernatant portion) 31. This state can be kept until an erasing magnetic field is applied from the back surface side (Portion "A" in FIG. 8 indicates the state in which the display is erased).

FIG. 9(A) is an enlarged view of the microcapsules 26 in a part of the part "A" in FIG. 8. The application of an erasing magnetic field from the back surface of the display permits the attraction of black magnetic fine particles 29 into the bottoms of the respective microcapsules 26, resulting in the vertical replacement of their positions with the light-reflecting non-magnetic fine particles 30 located in the bottom of the microcapsules 26. At the time of such a replacement, the light-reflective non-magnetic fine particles 30 are suspended in the upper portion of the dispersion liquid. If they are placed as they are, sooner or later they can be settled and stably placed on a condensed layer of the black magnetic fine particles 29 in the bottom as shown in FIG. 9(C).

FIG. 9(B) is an enlarged view of the microcapsules 26 in part "B" in FIG. 8. By the application of a write magnetic field from the front surface of the display, the black magnetic fine particles 29 are attracted to the front surface, while the position of the black magnetic fine particles 29 is replaced with the light-reflective non-magnetic fine particles 30. At the time of such a positional replacement, the light-reflective non-magnetic fine particles 30 are in the state of being suspended.

FIG. 9(C) is an enlarged view of a microcapsule 26 in part "C" in FIG. 8. The write magnetic field is removed from the state shown in FIG. 9(B), followed by the sedimentation of the black magnetic fine particles 29 and the light-reflective non-magnetic fine particles 30 without changing their locations because of their short sediment distances. In the bottom of the microcapsule 26, therefore, they keep their stability such that the aggregated black magnetic fine particles 29 are located at the upper portion while the aggregated light-reflective fine particles 30 are located at the lower portion.

Further, if the display sheet is finished as an end roll to be used as a rotatable-roll display, the display surface is vertically paced in general. In this case, however, the black magnetic fine particles that form characters and images are aggregated on the front surface of the display, while the light reflective non-magnetic fine particles are kept stable on the back surface in the state of being aggregated.

Accordingly, the improved magnetic display does not lose the characters and images once formed on the front surface of the display even though much time has elapsed, so that a perfectly stable display can be maintained until the erase magnetic field is applied. On the other hand, in the case of retaining the dispersion liquid in the conventional honeycomb cells 22 shown in FIG. 7, the honeycomb cells 22 have comparatively large dimensions and thus granulated magnetic particles 24 having comparatively large dimensions are used depending on the dimensions of the honeycomb cells 22. Therefore, the black color magnetic particles 24 precipitate with the passage of time and settle on the bottoms of the respective deep honeycomb cells 22. Consequently, they cannot be seen from the front surface of the display, resulting in the possibility of causing the characteristics and images to disappear. For taking countermeasures against such a problem, a comparatively large amount of a sedimentation-preventing agent to thicken the viscosity of the dispersant is used, resulting in the reduction in a sedimentation rate. Compared with the conventional type, using the microcapsules 26 as micro containers for retaining the dispersion liquid leads to the effects in which the improved magnetic display allows an excellent resource saving effect as described above and the stability of images being formed by the magnetic fields are extremely excellent.

The magnetic display of the above (2) is of the so-called magnetic orientation type. Such a kind of the magnetic display can be prepared by coating a microcapsule layer 34A, in which minute magnetic flakes 33 having anisotropy of shape are dispersed in an oily liquid, and a black protective film 35 of microcapsules 34 onto a transparent non-magnetic plastic sheet 32 in this order. Then, a magnetic field is applied on the display surface 36 in the horizontal direction to horizontally orient the magnetic flakes 33 in the microcapsules 34, bringing the magnetic display to the state of allowing the reflection of an incident light. Subsequently, a vertical magnetic field is partially applied on the display surface, bringing the magnetic display to the state of allowing the transmission of an incident light. Consequently, an image can be formed using a color contrast between the reflection and transmission of an incident light to be caused.

The dispersion liquid enclosing microcapsules to be used in this magnetic display include minute flat flakes having anisotropy of shape of several microns to several ten microns, so that microcapsules which are smaller than the improved microcapsules of the above item (1) have been used as containers for holding the dispersion liquid.

FIG. 11(A) is an enlarged view of a microcapsule 34 corresponding to a portion (Part "B" of FIG. 10) on which the vertical magnetic field is applied. FIG. 11(B) is an enlarged view of a microcapsule 34 corresponding to a portion (Part "A" of FIG. 10) on which the horizontal magnetic field is applied. As shown in the figure, an incident light reflects off magnetic flakes 33 vertically oriented in the microcapsule 34 one after another, and then the incident light reaches as transmitted light a black protective film 35 on the bottom where it is absorbed. If this portion is observed from the front surface of the display, it becomes one in which a black colored image is formed. Therefore, a contrast can be generated between such a portion and its surrounding portions on which the magnetic flakes 33 are horizontally arranged, i.e., the reflection on the horizontally-oriented surface. The magnetic display of the above first type (1) is characterized in that characters and images are formed from a black color inherent in magnetic particles such as black iron oxide fine particles on a white background to be caused by white pigments such as titanium dioxide as light-reflective non-magnetic fine particles. The magnetic particles move to the front surface side by the application of a write magnetic field from the outside to form a black-colored image. On the other hand, the light-reflective non-magnetic fine particles are hardly subjected to the magnetic induction even though the external magnetic field is applied thereon because they are non-magnetic particles, moving in the direction opposite to the movement of the magnetic particles. In other words, the magnetic display operates on the principle in which the non-magnetic particles passively move to the back surface of the display. However, as the black-colored magnetic particles and the white-colored light-reflective non-magnetic fine particles are used for the image-forming elements, the magnetic display is the so-called monochrome type by which an image to be formed is basically of a black color with a white background.

An attempt at colorization of the magnetic display of the above (1) type is to colorize only the background portion but not to colorize an image-forming portion. However, such a colorization has been carried out from the early days of the development of the above (1) type magnetic display. Such a colorization method was the addition of a color material into a dispersion liquid in which black iron oxide fine particles as magnetic particles and titanium oxide as light-reflective non-magnetic fine particles were dispersed. This method converted the method used for the above (2) type magnetic display disclosed in Japanese Patent application Laid-open No. Sho 50-160046.

The magnetic display disclosed in Japanese Patent Application Laid-open No. Sho 50-160046 is a colorized magnetic responsive shutter display in which a liquid with a dispersion of magnetic flakes having anisotropy of shape is enclosed in microcapsules and then the microcapsules are coated onto a sheet of film. For the colorization, the above patent application discloses three selective portions in which the color materials can be added, i.e.: (a) the capsule wall of the microcapsule; (b) the dispersion liquid in the microcapsules; and (c) the microcapsule-coated layer. In this case, a principle of an image formation using a contrast between a coloring color and a dark color is used. That is, a transparent dispersion liquid of the magnetic flakes in the microcapsule are colored with a color material (normal dye or pigment), so that an incident light on the microcapsule is reflected on the bright-finished flat surface of the magnetic flake and then the reflected light passes through the colored dispersion liquid. As a result, it can be observed as a coloring color. On the other hand, if the magnetic. flakes are oriented in a vertical direction, an incident light reflects on the vertically-oriented surfaces of the plurality of magnetic flakes one by one and is then transmitted to the back surface side, so that it can be observed as a dark color. Therefore, if such a principle of the colorization with the addition of a color material is applied to the above (1) type magnetic display where two components of light-absorptive black iron oxide fine particles and light-reflective non-magnetic fine particles are used as image-forming elements even though the color material is added to: (a) the capsule wall of the microcapsule; (b) the dispersion liquid in the microcapsules; or (c) the microcapsule-coated layer, the capsule wall of the microcapsule, the dispersion liquid, or the coated layer cannot become opaque by the color material (If it becomes opaque, an image cannot be viewed even though the image is formed using black magnetic fine particles in the microcapsules). Instead, they become a translucent colored capsule wall or a translucent colored dispersion liquid. Therefore, actually, a view is given only of a white color peculiar to the light-reflective non-magnetic fine particles in the microcapsules through the layer made of the translucent color material, so that it can be observed as a colored one. Consequently, the translucent color material cannot be effected on the characters and images to be formed by the light-absorptive magnetic fine particles having its original strong black color, so that an original black color can be shown.

Hereinafter, the characteristic features of these kinds of magnetic displays will be laid out in items as follows.

Conventional Type:

The substrate has a plurality of honeycomb-shaped cells several millimeters in width and 1.5 millimeters in depth between two hard panels.

The image formation is performed such that characters and images are formed by applying an external magnetic field on magnetic particles prepared by granulating black iron oxide particles with a resin, dispersed in the white-colored dispersion liquid and magnetically attracting them from the bottom to the top of the corresponding honeycomb cell.

Structural Features:

(1) Dimensions of the honeycomb cell are in the order of millimeters (2) As the dimensions of the honeycomb cell are large, a particle size of the magnetic particles must be in a range of about 50 to 150 microns.

(3) As the particle size of the magnetic particles are large, the dispersion liquid has a comparatively high viscosity and a high thixotropic property.

(4) Rough resolution.

Improved Type (a):

The substrate has a hard or soft flexible film. A dispersion liquid of image-forming elements enclosed in microcapsules are formed between two substrates by coating.

The image formation is performed such that an external magnetic field is applied to microcapsules containing dispersion liquid dispersing black iron oxide fine particles and fine particles of white pigments such as titanium dioxide so that the former is attracted from the bottom to the top and the latter is moved correspondingly to the bottom of the microcapsule, to form characters and images.

Structural Features:

(1) The size of the microcapsules is about 300 microns.

(2) The particle size of each of the magnetic fine particles and white pigments is in the order of sub-microns.

(3) As the elements to be dispersed are ultra fine elements, the dispersion liquid has a low viscosity and a low thixotropic property.

(4) High resolution.

(5) An excellent stability of an image after the image formation.

Improved Type (b):

The substrate has a soft flexible film. A dispersion liquid of image-forming elements enclosed in microcapsules are formed on the back surface thereof by coating.

The image formation is performed such that a horizontal or vertical magnetic field is applied on flat magnetic flakes dispersed in the dispersion liquid and then characters and images are formed by a contrast between reflected light and transmitted light generated by converting the orientation of the flat magnetic flakes from horizontal to vertical or from vertical to horizontal in the microcapsule.

Structural Features:

(1) The size of the microcapsule is in the range of 30 to 150 microns.

(2) The image-forming elements include only one component of flat magnetic flakes, which represents a metallic luster surface on the front surface thereof, such as nickel, in 10 to 20 microns in particle size.

(3) The dispersion liquid has a low viscosity and a low thixotropic property.

(4) High resolution.

(5) An excellent stability of an image.

The following colorization of the display can be attempted on each type of the magnetic displays classified as described above. <The prior art with respect to the conventional colorization of the display using colored granulated magnetic particles>

For the conventional honeycomb cell type display.

There are two prior art methods. In one method, magnetic particles are granulated by mixing magnetic fine particles with a colored resin and are then dispersed in a white-colored dispersion liquid, followed by the application of an external magnetic field to magnetically attract the colored granulated particles from the bottom to the top of the honeycomb cell to form a colored image (Japanese Patent Application Laid-open Nos. 2000-221922 and 2000-221923). Another method utilizes a colored granulation method (Japanese Patent Application Laid-open No. 2000-231348). In this method, the colored granulated magnetic particles are used just as in the former. In this method, however, a granulation method thereof is a tumbling method, in which fine magnetic particles are tumbled in a rolling drum with a binder sprayed to globulate the particles and are then dried and solidified to form magnetic particles as core particles, followed by subjecting the core particles to a coloring layer made of a color pigment and a synthetic resin while tumbling in the same drum with drying and solidifying afterward.

For the improved type (b) display.

At a comparatively early stage of the display in the improved type (b), a colorization was attempted to add a typical color material to provide a color display in the following manner.

Originally, the improved type (b) is a display which is prepared by dispersing minute magnetic flakes in a dispersion liquid and then enclosing them into microcapsules, followed by applying the capsules on a soft flexible substrate. The colorization of such a display is performed by the addition of a typical color material in any portion of: (a) a dispersion liquid where flat magnetic flakes as image-forming elements are dispersed; (b) capsule walls of the respective microcapsules in which such a dispersion liquid is enclosed; or (c) a coating layer of resin for applying the microcapsules on the substrate, any portion of which is added with a typical color material such as dye or pigment, to make a colored contrast on the display surface. The effects of the colorization by such a method allows only the colorization of a background portion other than an image-forming portion.

In the above description, the conventional methods for colorizing the magnetic display have been explained. However, each of them has the following problems.

Among the attempts to use colored magnetic particles instead of the conventional black magnetic particles, the magnetic particles disclosed in Japanese Patent Application Laid-open Nos. 2000-221922 and 2000-221923, where colored magnetic particles are obtained by kneading black magnetic fine particles with a resin and a color material or with a coloring resin, experience a decrease in saturation magnetization of each magnetic particle corresponding to a weight ratio of such non-magnetic materials added as the mixed coloring resin. The descriptions of these two official gazettes illustrate magnetic particles of black magnetite (black iron oxide $Fe_3O_4$), chromium dioxide ($Cro_2$), and so on (Column 11, lines 14–16 in Japanese Patent Application Laid-open No. 2000-221812), and the ratio of resin/coloring material to be added and mixed in the magnetic material is defined in the range of 10 to 40% (Column 12, lines 4–7 in the same official gazette).

There are two reasons that colored granulated particles are hardly obtained by the granulation method. First, original magnetic materials before coloring are those of black magnetite or chromium dioxide with a substantially inherent black color. Second, the coloring method comprises the steps of mixing powders of a black magnetic material and coloring pigments together and hardening the mixture with a resin provided as a binder. In this method, therefore, the coloring pigments are spread thinly over the whole body of the magnetic particles, so that they cannot be concentrated on the front surfaces of the respective granulated particles, resulting in substantially poor color-masking effects. In the descriptions found in the prior patent documents with respect to the magnetic displays, according to the description of an example for preparing black granulated particles by mixing black iron oxide particles with a resin, a solid-converted amount of the resin required for the binding granulation of the particles ranges from 20% (Japanese Patent Publication Laid-open No. Sho 53-127032) to at least 10% (Japanese Examined Patent Publication No. Sho 62-53359). In the usages of the prior patent, the magnetic particles after the granulation may remain as black magnetic particles, and thus the whole amount of the resin being added can be used as a binder. According to the granulation method of such a prior patent, a required amount of the resin to be used as a binder for preparing colored granulated particles of Japanese Patent Application Laid-open No. 2000-221922 may be reasonably estimated to be 10% at the minimum. The remainder (90%) should be composed of black magnetite provided as an inherent black magnetic material and coloring pigments. Further, one of them is the magnetic material that shows an intense black color. Thus, it is easily considerable that the coloring pigments to be mixed for countering the black color should be mixed with a quantitative ratio much higher than an amount of the black color material, namely the magnetic material.

If the colorization effect can be obtained by defining a mixing ratio between the coloring pigments and the magnetic material to 7:3, the composition ratio of colored granulated particles is as follows.

| | |
|---|---|
| Magnetic material | 27% |
| Coloring pigments | 63% |
| Binding resin | 10% |

In other words, the coloring effects of the colored granulated particles may be attained by the above composition. However, the saturation magnetization thereof decreases to 21.6 emu/g corresponding to 27% of 80 emu/g of the original magnetic material, as a result of the addition of the coloring pigments and the biding resin. Consequently, the magnetic properties of the magnetic particles are extremely deteriorated, so that they become difficult to migrate in the dispersion liquid with a normal viscosity even though a strong external magnetic field is applied from the outside on the dispersion liquid. It is theoretically possible that the viscosity and thixotropic property of the dispersion liquid is adjusted below to allow the migration of the magnetic particles with a saturation magnetization of 21.6 emu/g. In this case, however, the specific gravity of the granulated particles may be decreased to some extent by the addition of the resin. As the diameter of the granulated particle is of a large particle size of 75–150 microns (Column 5, lines 15–16 in the official gazette), in the dispersion liquid with the adjusted low viscosity and the low thixotropic property, the colored magnetic particles involved in the image formation can rapidly settle on the bottom of the honeycomb cell. As a result, the image already formed will disappear at once.

In the coloring method for the magnetic particle as described above, fine powders of black color magnetite or chromium dioxide provided as a row material are simply mixed with color pigments, followed by a binding granulation with a resin. In the coloring granulation method described in Japanese Patent Application Laid-open No. 2000-231348, on the other hand, fine powders of a magnetic body are floated and suspended in a fluid tumbling from the bottom of a rolling motion flowing granulation device (see FIG. 2 in the official gazette) while spraying a binder to form aggregates. Then, when the tumbling motion is applied on the aggregates, the aggregates are gradually constricted to reduce a space between the adjacent particles as in the case of snow-balling. Thus, the aggregates grow as the core consists of magnetic particles. Subsequently, pigments with binder to be provided as a color material are spray-coated around the core consisting of magnetic particles. Thus, the colored granulated particles formed of the magnetic bodies coated with a color pigment layer can be obtained.

Regarding the composition of the colored granulated particles (i.e., magnetic particles) obtained by the granulation method, the following items can be found in the official gazette.

(1) Magnetic bodies to be used to form a core are those of one selected from black color magnetite, γ-hematite, and chromium dioxide (Column 2, lines 12–13 of page 2 in the official gazette).

(2) A coating amount of the coloring layer is in the range of 10 to 35wt % of the particles after the colorization (Column 3, line 17 of page 3 in the official gazette).

In this case, that is, the weight of the magnetic body to be provided as a core, which includes a binder, is in the range of 90 to 65%.

(3) A weight ratio of the color pigments and the synthetic resin in the coloring layer may be preferably 9:1 to 5:5 (Column 3, lines 21–22 of page 3 in the official gazette).

(4) An overcoat agent is 10 wt %.

From the above items (1) to (4), the composition of the final colored particles, the amount of pigments in the coloring layer with respect to such a composition, a saturation magnetization to be calculated from the content of the magnetic body core, and so on can be extracted as shown in the following table.

Composition of Colored Granulated Particles
(Japanese Patent Application Laid-open No. 2000-231348)

| | | Upper limit | Lower limit | Median value between upper and lower limits |
|---|---|---|---|---|
| Core-forming magnetic body | | 72% | 50% | 61% |
| Binder required for core generation | | 8% | 5% | 6% |
| Coating agent for covering around core with color coloring layer | | 10% | 35% | 23% |
| Overcoat agent (preventing peeling of the coloring layer with resin layer without pigments) | | 10% | 10% | 10% |
| Total | | 100% | 100% | 100% |
| Percentage of pigments in the coating agent | Upper limit | 9% | 31.5% | 20.7% |
| | Lower limit | 5% | 17.5% | 11.5% |
| Saturation magnetization when colored granulated particles are prepared using black magnetite as core | | 58 emu/g | 40 emu/g | 49 emu/g |
| Saturation magnetization using SUS430 | | 139 emu/g | 95 emu/g | 116 emu/g |

As shown in the table, the saturation magnetization when colored granulated particles are prepared using black magnetite as a magnetic body for forming a core calculated from each numerical value of the components in the composition of the official gazette is in the range of 40 to 58 emu/g, which corresponds to the item (b) of claim 1 in the official gazette. An upper limit of 58 emu/g in the saturation magnetization is slightly lower than the saturation magnetization of black granulated magnetic particles presently used in the conventional (honeycomb cell type) magnetic display. Thus, it is in a practical range with respect to the magnetic property. As shown in the table, however, the amount of the magnetic body to be provided as a core required for attaining the saturation magnetization of 58 emu/g becomes 72%. Therefore, the coating agent to be required for covering around the core should be reduced to 10%, while the pigments to be contained in the coloring layer should be reduced to 5 to 9%. If the coloring layer is only about 10% of the total weigh of the colored granulated particles, it may become a significantly thin color coating based on the estimation of a particle size after the colorization. Therefore, it can be easily estimated that such a coloring layer may be insufficient to provide a cover for an intense black color of the core consisting of the magnetic body, and the black color can be seen through.

On the other hand, the maximum percentage of the coloring layer to be required for sufficiently obtaining the colorization effect by coating the black may be 35%. Thus, the amount of magnetic body to be the core is reduced to 50%. As a result, the saturation magnetization decreases to 40 emu/g, causing the deterioration of the magnetic properties of the colored granule particle. Therefore, the desired magnetic induction effect cannot be obtained with respect to the application of a magnetic field from the outside. In the right end of the table, median values between the upper and lower ends are listed. In this case, the colorization effect of the colored granulated particles can be obtained, though the magnetic induction effect may be insufficient. The colorization of the magnetic particles using such a method does not solve the problems because of the antinomy relationship between the amount of colored coating allowing a good coloring effect and the amount of magnetic body allowing a good saturation magnetization. Thus, one becomes well while the other becomes insufficient.

On the other hand, when ferrite comprising mainly stainnless steel described in the above official gazette is used as magnetic bodies to be provided as the respective cores, the front surface color of each of the magnetic bodies is not a black color but a metallic color. Thus, it becomes possible to reduce the amount of coloring layer for color-coating. In addition, as shown in the bottom of the table, the above bodies contain Fe as its component, so that a high saturation magnetization can be obtained due to the composition of Fe. However, the stainless ferrite is of little practical use economically. That is, the cost of such a kind of the ferrite is several-fold higher than that of the black magnetite.

Among the prior art technologies described above, the colorization of the magnetic display by the method of Japanese Patent Application Laid-open No. Sho 50-160046 is that one of the microcapsule's capsule wall, the dispersion liquid, and the coating layer is colorized using a dye or pigments generally used in the art. Then, reflected light from magnetic flakes being horizontally oriented in the microcapsule passes through a colored layer of one of the above portions to represent a coloring color on the display surface. On the other hand, the vertical surface of the magnetic flakes being vertically oriented at the time of character or image formation does not reflect an incident light on the display surface, so that the incident light can be transparently absorbed into the back surface of the display. As a result, a dark-colored character or image is displayed on the display surface. In other words, the colorization cannot be effected on the character or image formed. Only the background portion (i.e., horizontally oriented portion) is colorized.

In the colorization of the magnetic display disclosed in each of Japanese Patent Application Laid-open Nos. 2000-221912 and 2000-221913, black iron oxide particles such as black magnetite, provided as magnetic particles to be used in the magnetic display of the conventional type (honeycomb type), are mixed with various coloring pigments, followed by biding and hardening the mixture with a synthetic resin. However, as described above, such a kind of the colorization is physically difficult.

In Japanese Patent Application Laid-open No. 2000-231348, further, magnetic particles such as granulated black magnetite particles are used as cores of the respective colored granulated particles. That is, each of the cores is coated with both a colored coating layer and a protective layer made of a resin to provide a magnetic display. In this case, however, it is of little practical use because the color of the black magnetic particles cannot be masked if the thickness of the colored coating layer is insufficient.

In view of the above facts, prior to the present invention, the present applicant filed a patent application (Japanese Patent Application 2001-177128) that discloses the colorization of a magnetic display without using any colored granulated magnetic particle.

In the colorization of the magnetic display in accordance with the patent application, as shown in FIG. 12, the magnetic display comprises two substrates 37, 38, in which microcapsules 36 are applied. Each of the microcapsules 36 contains and seals a dispersion liquid of image-forming elements. Of two substrates, the transparent substrate 37 is located on the front side of the display. Flake-shaped particles 39 having a multi-layered structure are arranged on the entire front or back surface of the transparent substrate 37 to form an array layer 39A (i.e., a pearl pigment layer). In other words, although character or image is to be represented in black color on the surface of the display, because it is seen through the above array layer 39, it may be color-converted to various interference colors depending on the kind of pearl pigments.

The flake-shaped particle array layer 39A comprised of the specified "multi-layered structure" to be used in the above colorization exerts a filter function. That is, if the array layer 39A is placed on a dark color, a strong interference color can be observed as a result of the interaction among transmission, refraction, and multiplexed reflection of an incident light. On the other hand, if it is placed on a white color, an achromatic color can be observed because a complementary color which is a transmittable component of the incident light is reflected again because of the white color.

Using such a principle, a black character or image formed by black iron oxide can be color-converted to an interference color, while a white background by white pigments remains as it is. Therefore, this method allows conversion of the color contrast from B/W (black on white) into C/W (color on white), in which a colored character or image can be formed on the white background.

The invention disclosed in the above patent application is a revolutionary new technology because of its colorization mechanism without using any coloring material. In this method, an image-forming part of the magnetic display can be colorized using a wide variety of interference colors obtained by changing the composition ratio between the transmitted light and the reflected light by means of a filter function of the flake-shaped particles 39 having the multi-layered structure. In this case, however, the array layer 39A comprised of the flake-shaped particles 39 with the multi-layered structure extends over the entire flat surface of the display. Therefore, a so-called "angle-dependency" phenomenon is unavoidable. The angle-dependency is a phenomenon whereby an interference color to be generated by the change in the composition ratio between the transmitted light and the reflected light due to the multi-layered structure becomes slightly different when the display surface is tilted from its vertical position.

That is, if the flake-shaped particles 39 of the multi-layered structure are oriented in parallel to the whole surface of the display, a color tone obtained by viewing from the vertical plane with respect to the display surface is different from a color tone obtained by viewing from the slanted plane with respect to the display surface. This is because the resulting change in the angle of an incident light leads to the change in the angle of reflected light, so that the composition ratio among the reflected light and the transmitted light and the transparent scattered light also changes, resulting in the change in the color tone. Therefore, the angle dependency is a phenomenon peculiar to interference colors or spectral colors that utilizes a multi-layered structure also observed in a thermochromic liquid crystal or the like, in which molecular orientation is represented as a helical multi-layered structure.

Accordingly, as described above, the invention disclosed in the above patent application is a revolutionary new technology because of its colorization mechanism in which an image to be formed on the display surface can be colorized without using any coloring material. In this case, however, if the display is placed on a table to see something displayed on its screen, the display surface is in many cases slanted with respect to the viewing angle of a person. Therefore, the angle dependency of the resulting color display is undeniably its only defect.

SUMMARY OF THE INVENTION

Therefore, an object of the present invention is to provide a magnetic display capable of colorizing an image formed on the display surface and of solving the problem of angle dependency of an interference color, in which a black color that is a color inherently exhibited by magnetic particles to be provided as indispensable character- and image-forming elements is converted into a wide variety of colors without using any coloring material or the like.

According to the present invention, there is provided a magnetic display in which a microcapsule layer containing and sealing light-reflective non-magnetic fine particles and light-absorptive black magnetic fine particles dispersed in an oily liquid is applied between two non-magnetic substrates, and at least one of the non-magnetic substrates is transparent. A magnetic field for forming a character or image is applied from a front surface of the display with a transparent substrate side being the front surface thereof, and a magnetic field for erasing the character or image is applied from a back surface of the display to shift the positions of the light-absorptive black magnetic fine particles and the light-reflective non-magnetic fine particles within the microcapsules from the back surface to the front surface or from the front surface to the back surface of the display to thereby form or erase the character or image. The magnetic display comprises an array layer buried in a capsule wall made of a polymer material serving as a capsule wall of each of the microcapsules for enclosing the oily dispersion liquid that contains the light-absorptive black magnetic fine particles and light-reflective non-magnetic fine. Flake-shaped particles having a multi-layered structure for converting the black color of a character or image formed on a display surface, which is a color inherent in the light-absorptive black magnetic fine particles in the dispersion liquid, into interference colors are arranged so as to be oriented in parallel to the capsule wall along the entire spherical surface of the microcapsule.

As the magnetic display is constructed as above, the array layer of flake-shaped particles in the multi-layered structure, which is buried in the wall surface of the microcapsule, exerts a filter function producing complex effects of transmission, refraction, and multiplexed reflection of an incident light from the display surface. Consequently, the black color of characters and images to be formed on the display surface can be converted into interference colors in accordance with the flake-shaped particles, selected, allowing formation of color image on the display surface. Further, the flake-shaped particles in the multi-layered structure are buried in the capsule wall of the polymer material serving as the capsule wall of the microcapsule that encloses the oily dispersion liquid containing the light-absorptive black magnetic fine particles and the light-reflective non-magnetic fine particles, as an array layer being aligned in parallel to the capsule wall along the entire spherical surface of the microcapsule. Therefore, regardless of from which angle the spherical microcapsule is viewed (i.e., without regard to the viewing angle) this viewing angle is always oriented vertically with respect to the flake-shape particles. In other words, even if the display surface in which the spherical microcapsules are applied on the transparent substrate is viewed from a slanted angle with respect to the display surface, the flake-shape particles disposed in the capsule wall of each of the microcapsules which come into the view of a person are always oriented vertically with respect to the viewing angle. Thus, the interference color obtained when viewing the display surface from the vertical direction can be obtained.

In addition, the oily dispersion liquid in the microcapsule having an array layer of flake-shaped particles having a multi-layered structure in the capsule wall of the polymer material serving as a capsule wall of the microcapsule may be colored using a dye or pigments generally used in the art.

With the above arrangement, the erase portion or the background portion of character or image formed on the display, which would bear a white color that is a color inherently exhibited by light-reflective non-magnetic fine particles, is colored. In addition, such a portion thus colored can also be converted into an interference color by the filter effect of the flake-shape flake-shaped particles being disposed in the capsule wall of the microcapsule. Therefore, it is possible to obtain a color contrast of the different interference colors generated in both the image-forming portion and the background portion of the display surface. This is realized by the so-called "dichromatic principle," in which when the flake-shape particles of the multi-layered structure are aligned in parallel and are then stacked on a base color other than white, the mixing composition ratio between the transmitted light (i.e., light transmitted through the optically-transmissive flake-shaped particles) and the reflected light changes according to the base color.

BRIEF DESCRIPTION OF THE DRAWINGS

FIG. 7 is a cross sectional view that illustrates the configuration and operation of the conventional (using honeycomb cells) magnetic display;

FIG. 8 is a cross sectional view that illustrates the configuration and operation of the improved type (using microcapsule) magnetic display;

FIGS. 9(A), 9(B), and 9(C) are enlarged views of the microcapsules in the parts A, B, and C in FIG. 8, respectively;

FIG. 10 is a cross sectional view that illustrates the configuration and operation of the improved type (using microcapsule) magnetic display;

FIGS. 11(A) and 11(B) are enlarged views that illustrate the behaviors of the minute flat magnetic flakes suspended in the dispersion system enclosed in the microcapsule to be used in the "magnetic orientation type" display as one of the improved type magnetic displays; and FIG. 12 is a cross sectional view for illustrating the configuration of the improved type (using microcapsule) magnetic display in which the array layer comprised of flake-shape particles, having the multi-layered structure, is applied on the whole surface of the transparent substrate on the display surface side.

DETAILED DESCRIPTION OF THE PREFERRED EMBODIMENTS

Figure 1:
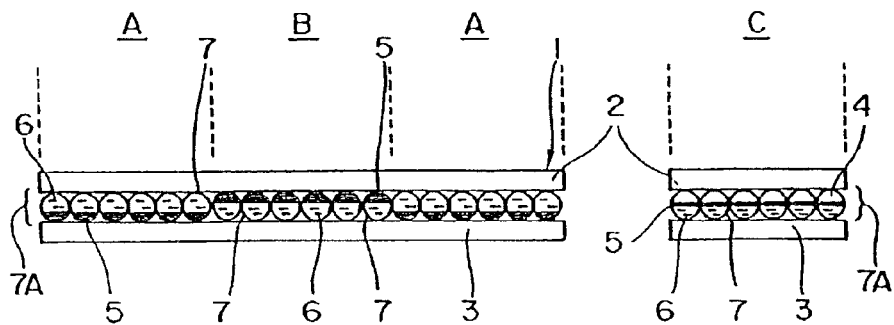
FIG. 1 is a cross sectional explanatory view that illustrates a magnetic display as one of the embodiments of the present invention.
Figure 2:
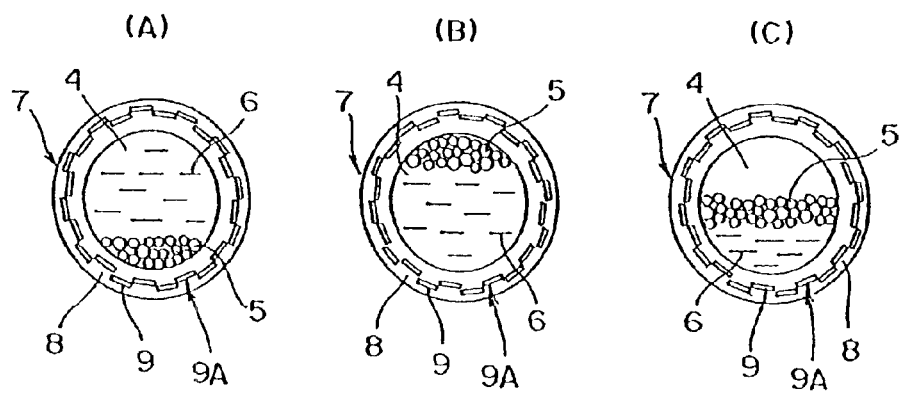
FIGS. 2(A), 2(B), and 2(C) are enlarged cross sectional views of the parts A, B, and C of the microcapsule shown in FIG. 1, respectively.
Figure 3:
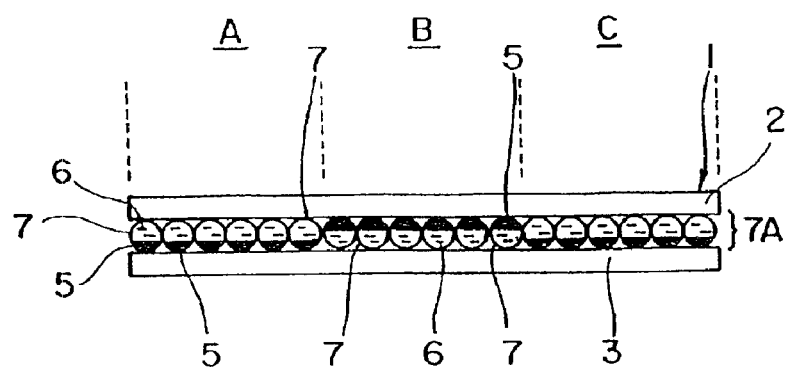
FIG. 3 illustrates a magnetic display as another embodiment of the present invention, in which an oily dispersion liquid 4 within a microcapsule is colored so that an interference color is generated not only on an image-forming portion but also on a background portion.
Figure 4:
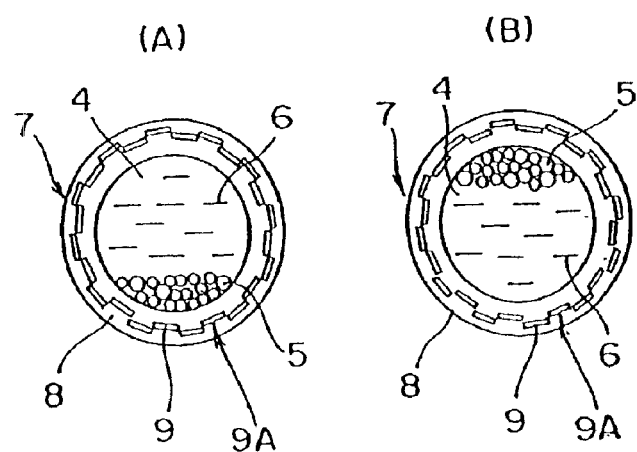
FIGS. 4(A) and 4(B) are enlarged cross sectional views of microcapsules of the parts A and B to be used in the magnetic display shown in FIG. 3, respectively.
Figure 5:
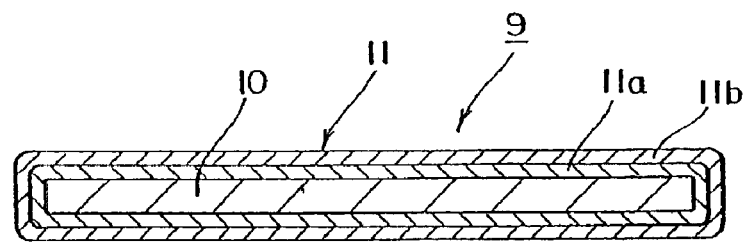
FIG. 5 is a partial cross-sectional perspective view for illustrating flake-shaped particles disposed in a capsule wall of the microcapsule shown in FIGS. 2(A), 2(B), and 2(C) and FIGS. 4(A) and 4(B)
Figure 6:
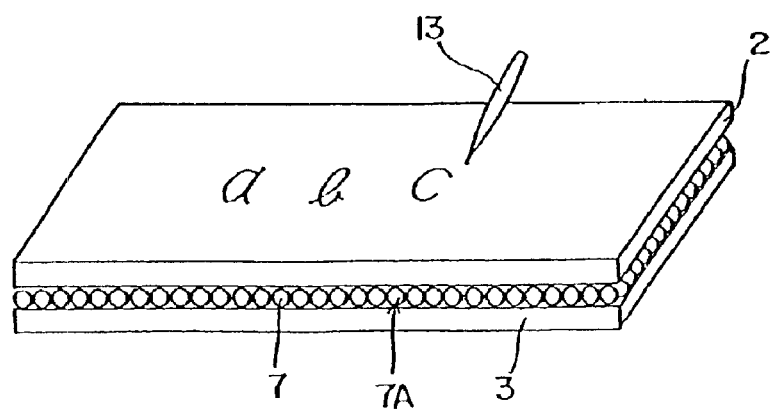
FIG. 6 is an explanatory view in which characters are formed on the magnetic display shown in FIG. 1.

The present invention will be described in detail with reference to the embodiments shown in the drawings. FIG. 1 is a cross sectional explanatory view that illustrates a magnetic display as one of the embodiments of the present invention. FIGS. 2(A), 2(B), and 2(C) are enlarged cross sectional views of the parts A, B, and C of the microcapsule to be used in the magnetic display shown in FIG. 1, respectively. FIG. 3 illustrates in section a magnetic display as another embodiment of the present invention, in which oily dispersion liquids within the respective microcapsules are colored so that interference colors are generated not only on an image-forming area but also on background colors. FIGS. 4(A) and 4(B) are enlarged cross sectional views of microcapsules of the parts A and B to be used in the magnetic display shown in FIG. 3, respectively. FIG. 5 is a partial cross sectional perspective view illustrating a flake-shaped particle disposed in a capsule wall of the microcapsule shown in FIGS. 2(A), 2(B), and 2(C) and FIGS. 4(A) and 4(B). Further, FIG. 6 is an explanatory view in which characters are formed on the magnetic display shown in FIG. 1.

The magnetic display of the present embodiment comprises two non-magnetic substrates 2, 3 and a microcapsule layer 7A applied between these substrates 2, 3. At least one of the non-magnetic substrates 2, 3 is transparent. In this embodiment, the non-magnetic substrate 2 having a display surface 1 is transparent. The microcapsule layer 7A comprises a plurality of microcapsules 7. Each of the microcapsules 7 encloses light-absorptive black magnetic fine particles 5 and light-reflective non-magnetic fine particles 6 dispersed in an oily dispersion liquid 4.

An array layer 9A comprised of flake-shaped particles 9 having a multi-layer structure with a filter function is disposed in a capsule wall 8 of the microcapsule 7 such that the array layer 9A covers the whole area of the capsule wall 8 of the microcapsule 7, and each of the flake-shaped particles 9 is aligned in parallel to the surface of the capsule wall 8 of the microcapsule 7. Here, due to the filter function an inherently black color of the light-absorptive black magnetic fine particles 5 in the oily-dispersion liquid 4, which is to be used for representing characters or images on the display surface 1, is converted into an interference color.

The flake-shaped particles 9 have the multi-layered structure with the filter function and attain complex effects of an interference color by the interaction among transmission, refraction, and multiplex reflection of light in each layer of the multi-layered structure. Such complex effects of the interference color can remarkably appear when they are overlapped on a dark-colored substrate, especially on a black substrate. In this case, the flake-shaped particles 9 are generally called "pearlescent pigments" or "pearl pigments", which are used in various kinds of applications such as paintings for the body surface of automobiles, heat-wire reflection paintings, light-scattering agents for back lights of liquid crystal display panels, makeup cosmetics, and so on. The flake-shaped particles 9 are formed such that a coating material 11 is coated on the surface of a substrate material 10 (FIG. 5).

As the substrate material 10, one kind or two kinds selected from natural mica, synthetic mica, tabular alumina, and tabular silica are used in many cases. As the coating material 11, one of titanium oxide, iron oxide, and cobalt titanate is coated on the substrate material 10 surface as a single layer.

The substrate material 10 and the coating material 11 are selected as appropriate according to the color desired to be emphasized. That is, the base color underneath can be converted into a specific interference color to be emphasized, on the basis of the reflection and transmission of light through the optically-transmissive flake-shaped particle 9 at the boundary between the substrate material 10 and the coating material 11 due to the difference between the refractivity of the substrate material 10 and the coating material 11 that are selected.

The coating material 11 to be coated on the substrate material 10 is not limited to a single layer. Alternatively, it may be provided as a plurality of layers, allowing the increase in the number of color variations of the interference color. In this embodiment, as shown in FIG. 5, two coating materials 11a, 11b are coated on the substrate material 10 to form the coating material 11. When the substrate material is thus coated with plural (two) layers, the thickness of each of the coating films respectively made of the coating materials 11a, 11b may be changed to allow the variations in the composition ratio between the transmitted light and the reflected light. Thus, the number of options can be increased for changing the color tone of interference colors. In the present embodiment, natural mica (muscovite) is used as the substrate material 10. In addition, a complex layer (double layers) comprised of titanium dioxide ($TiO_2$) and casiterite (tin dioxide, $SnO_2$) is provided as the coating materials 11a, 11b to be applied on the surface of the natural mica.

Most of the flake-shaped particles 28 constructed as described above have dimensions of 5–60 micronsin width and about 0.4 micronsin thickness.

As described above, the microcapsule 7 has a capsule wall 8 in which array layer 9A comprised of flake-shaped particles 9 having a multi-layered structure has the above filter function. Such a microcapsule 7 can be prepared as follows.

First, using a common method, light-absorptive black magnetic fine particles 5 and light-reflective non-magnetic fine particles (white pigments) 6 are dispersed in an oily dispersion liquid 4. Then, the oily dispersion liquid 4 is emulsified in a polymer (gelatin) solution so as to make emulsified droplets in a desired size, surrounded by polymer rich solution phase-separated there-from optimizing the relevant conditions such as a pH value, a temperature, and a stirring speed of the dispersion system. As the final processes, a dehydration and insolubilization treatments are given for the polymer rich phase to make it as a solid capsule wall of the microcapsules 7.

Separately from the above, a gelatin solution is prepared. The gelatin aqueous solution contains dissolved gelatin in an amount corresponding to 10% of the gelatin volume used in the microcapsule. Further, water is added to the gelatin aqueous solution. The amount of water added is twice that of the gelatin aqueous solution. Then, flake-shaped particles 9 having the multi-layered structure was added to the solution in an amount equivalent to 7% by weight of the inner phase amount of the microcapsule (the amount of dispersion liquid in the capsule) to prepare a gelatin aqueous solution in which the flake-shaped particles 9 are uniformly dispersed.

After the general step of preparing the microcapsules, when the particle size of a liquid droplet of the dispersion liquid to be enclosed in the microcapsule comes within the desired range, and the concentrated phase of the phase-separated gelatin forms a capsule wall at the interface of the liquid droplet, a gelatin aqueous solution in which the flake-shaped particles 9 the multi-layered structure are dispersed is added. Then, the conditions such as a pH value and a stirring speed are adjusted. Consequently, as shown in FIGS. 2(A) to 2(C), a microcapsule 7 in which an array layer 9A of flake-shaped particles 9 are disposed in a capsule wall 8 is obtained. In this case, the flake-shaped particle 9 is about 0.4 micronsin thickness and is shaped like a thin flat plate. Thus, the flake-shaped particles 9 tend to be aligned in parallel to the capsule wall 8 in accordance with the formation of the capsule wall 8, so that the flake-shaped particles 9 can be aligned parallel to the surface of the capsule wall 8. As a result, a microcapsule 7 in which an array layer 9A covers substantially the whole area of the capsule wall 8 is obtained. Subsequently, ordinary dehydration and insolubilization treatments are performed on the capsule wall 8 of the microcapsule 7, in which the array layer 9A of the flake-shaped particles 9 is thus obtained, followed by the addition of a binder to provide an application liquid of the microcapsule 7.

Further, the oily dispersion liquid 4 in the microcapsule 7 may be colored using a normal dye or pigments. In FIG. 3, there is shown a magnetic display in which the oily dispersion liquid 4 in the microcapsule 7 is colored. In this case, on a display surface of the magnetic display, an interference color can be observed not only on the image-forming portion but also on the background portion.

In the magnetic display constructed as described above, the array layer 9A comprised of the flake-shaped particles 9 having the multi-layered structure, which is disposed in the surface of the capsule wall 8 of the microcapsule 7, exerts a filter function causing complex effects of transmission, refraction, and multiplex reflection of an incident light from the display surface 1. As a result, characters and images that are formed in black color on the display surface 1 can be color-converted into interference colors depending on the flake-shaped particles 9, allowing the formation of color image on the display surface 1. Further, the flake-shaped particles 9 having the multi-layered structure with the above-described filter function are disposed as the array layers 9A are aligned in parallel to the capsule wall 8 along the entire spherical surface of the microcapsule 7 into the capsule wall 8 of the microcapsule 7 that encloses the oily liquid dispersing the light-absorptive black magnetic fine particles 5 and the light-reflective non-magnetic fine particles 6. Therefore, regardless of from which angle the spherical microcapsule 7 is viewed, this viewing angle is always oriented vertically with respect to the flake-shaped particles. In other words, even when viewed from a slanted angle with respect to the display surface, the display does not suffer from the problem of color change occurring due to the angle dependency.

That is, according to the present invention, the array layer 9A comprised of flake-shaped particles 9 in the multi-layered structure is disposed in the capsule wall 8 of the microcapsule 7 in which light-absorptive black magnetic fine particles 5 and light-reflective non-magnetic fine particles 6 are dispersed in the oily-dispersion liquid 4, in a manner such that these flake-shaped particles 9 are aligned in parallel to the spherical surface of the microcapsule 7. Then, the microcapsules 7 are applied on the transparent non-magnetic substrate 2 of the two non-magnetic substrates 2, 3. As a result, even if the display surface 1 is vertically viewed or viewed obliquely by tilting the display surface 1, only the portion of the flake-shaped particles disposed in the capsule wall 8 of the microcapsule 7 which may be brought into the view of a person changes. The reflected light from those flake-shaped particles 9 which are brought into view can always be viewed at the same angle as that of viewing from the vertical direction. Thus, the problem of the angle dependency which is peculiar to the multi-layered structure is overcome.

As described above, the microcapsule 7 has the array layer 9A comprised of flake shape particles 9 with the multi-layered structure in the capsule wall 8 of the microcapsule 7. If an oily dispersion liquid 4 to be enclosed in such microcapsule 7 is previously colored with a normal dye or pigments, the erase portion or background portion of the character or image formed on the display surface 1 which would bear white color that is inherent in light-reflective non-magnetic fine particles 6 is colored. Such a portion to be colored can also be converted into an interference color. Therefore, the image-forming portion and the background portion of the display surface 1 are able to obtain a color contrast between different colors (see FIG. 3). This is realized by the so-called "dichromatic principle" in which when the flake-shaped particles 9 of the multi-layered structure are aligned in parallel and are then stacked on a base color except white, the mixing composition ratio between the transmitted light and the reflected light changes due to the reflectivity of the base color.

Hereinafter, we will describe a concrete example of the interference color being converted in the magnetic display constructed as described above, with reference to FIG. 6.

(a) Pearl pigments (221-WNT (Blue) available from Merck Co., Ltd.) were provided as flake-shaped particles 9 with a multi-layered structure and were disposed in the capsule wall 8 of the microcapsule 7. Then, color-free oily dispersion liquid 4 was enclosed in the microcapsule 7, thus completing a magnetic display. In this magnetic display, electric fields corresponding to the letters a, b, and c were applied on the display surface 1 by sequentially writing these letters with the scanning movement of a magnetic pen 13. Consequently, the color of each letter was converted into blue, while the background portion becomes white (see FIG. 1 and FIGS. 2(A), 2(B), and 2(C)).

(b) Pearl pigments (215-WNT (Red) available from Merck Co., Ltd.) were provided as flake-shaped particles 9 with a multi-layered structure and were disposed in the capsule wall 8 of the microcapsule 7. Further, blue pigments (Cyanine Blue GD-311 available from Sanyo Color Works, Ltd.) were dispersed in the oily disperse liquid 4 in the microcapsule 7 to color the dispersed liquid 4. In this magnetic display, magnetic fields correspond to the letters a, b, and c were applied on the display surface 1 by sequentially writing these letters with the scanning movement of a magnetic pen 13. Consequently, the color of each letter was converted into reddish purple, while the color of the background portion except letters was converted into violet (see FIG. 3 and FIGS. 4(A) and 4(B)).

As has been described above, according to the present invention, in the magnetic display in which a microcapsule layer containing and sealing light-reflective non-magnetic fine particles and light-absorptive black magnetic fine particles dispersed in an oily liquid is applied between two non-magnetic substrates, and at least one of the non-magnetic substrates is transparent. A magnetic field for forming a character or image is applied from a front surface of the display with a transparent substrate side being the front surface thereof, and a magnetic field for erasing the character or image is applied from a back surface of the display to shift the positions of the light-absorptive black magnetic fine particles and the light-reflective non-magnetic fine particles within the microcapsules from the back surface to the front surface or from the front surface to the back surface of the display to thereby form or erase the character or image. The magnetic display includes an array layer buried in polymer material serving as a capsule wall of each of the microcapsules for enclosing the oily dispersion liquid that contains the light-absorptive black magnetic fine particles and light-reflective non-magnetic fine particles. Flake-shaped particles that form a multi-layered structure for converting the black color of a character or image formed on a display surface, which is a color inherent in the light-absorptive black magnetic fine particles in the dispersion liquid, into interference colors are arranged so as to be oriented in parallel to the capsule wall along the entire spherical surface of the microcapsule. With such an arrangement, the array layer of flake-shaped particles having the multi-layered structure, which is buried in the wall surface of the microcapsule, exerts a filter function producing complex effects of transmission, refraction, and multiplexed reflection of an incident light from the display surface. Consequently, characters and images of black color to be formed on the display surface can be converted into interference colors in accordance with the flake-shaped particles selected. Therefore, a color image can be formed on the display surface without use of any coloring material with respect to the black color that is a color inherent in the magnetic particles that are indispensable elements for forming an image or character.

Further, the flake-shaped particles that have a filter function and have the multi-layered structure are buried as the array layer by being arranged so as to be oriented parallel to the capsule wall surface along the entire spherical surface of the microcapsule, encloses the oily dispersion liquid containing the light-absorptive black magnetic fine particles and the light-reflective non-magnetic fine particles. Therefore, no matter from which viewing angle the spherical microcapsule is viewed, the flake-shaped particles are oriented vertically with respect to the viewing angle. Thus, it is possible to attain the same interference color as that obtained when the display surface is viewed from the vertical angle.

In addition, if the oily dispersion liquid within the microcapsule is previously colored using an ordinary dye or pigments, the erase portion or the background portion of character or image formed on the display surface which would bear a white color that is an inherent color exhibited by light-reflective non-magnetic fine particles is colored. Such a portion thus colored can also be converted into an interference color. Therefore, it is possible to obtain a color contrast of different interference colors generated in both the image-forming portion and the background portion of the display surface.

What is claimed is:

1. A magnetic display device comprising:
    a first non-magnetic substrate;
    a second non-magnetic substrate, at least one of said first non-magnetic substrate and said second non-magnetic substrate being transparent and having a display surface; and
    a microcapsule layer arranged between said first non-magnetic substrate and said second non-magnetic substrate, said microcapsule layer comprising a plurality of microcapsules each including:
    a spherical capsule wall including an array layer embedded therein along an entirety of an outer spherical surface of said capsule wall, said array layer including optically-transmissive flake-shaped particles arranged in a multi-layer structural arrangement so as to convert a black color of an image formed on said display surface into interference colors, each of said flake-shaped particles being oriented so as to be parallel to an outer surface of said spherical capsule wall;
    an oily liquid accommodated within said capsule wall;
    light-absorptive black magnetic fine particles dispersed in said oily liquid within said capsule wall; and
    light-reflective non-magnetic fine particles dispersed in said oily liquid within said capsule wall.

2. The magnetic display device of claim 1, further comprising:
    a first magnetic member for applying a magnetic field to said display surface so as to form an image on said display surface; and
    a second magnetic member for applying a magnetic field to a rear surface of said display device opposite said display surface so as to erase the image from said display surface, said first magnetic member and said second magnetic member being operable to shift positions of said light-absorptive black magnetic fine particles and said light-reflective non-magnetic fine particles within said capsule wall of each of said microcapsules between a location closest to said display surface and a location closest to said rear surface.

3. The magnetic display device of claim 2, wherein said oily liquid comprises a colored oily liquid having at least one of a dye and pigments.

4. The magnetic display device of claim 1, wherein said oily liquid comprises a colored oily liquid having at least one of a dye and pigments.

5. The magnetic display device of claim 1, wherein each of said flake-shaped particles includes a substrate material and a coating material coating said substrate material.

* * * * *